July 11, 1967  S. E. SUMMERS ETAL  3,330,440
PRESSURE RELIEF VALVE
Filed Nov. 1, 1965

INVENTORS
STANLEY E. SUMMERS
RUDOLF VISKET
BY
ATTORNEY

United States Patent Office 3,330,440
Patented July 11, 1967

3,330,440
PRESSURE RELIEF VALVE
Stanley E. Summers, Woodland Hills, and Rudolf Visket, Anaheim, Calif., assignors to Calmec Manufacturing Corporation, Los Angeles, Calif., a corporation of Nevada
Filed Nov. 1, 1965, Ser. No. 505,846
9 Claims. (Cl. 220—89)

This invention relates to pressure relief valves and in particular to pressure relief valves employing a rupturable diaphragm or disc.

In our prior Patent 3,155,271 there is disclosed a rupture disc mounting and relief valve housing utilizing a rupturable disc which is spring biased by a snap-over spring element and which, when snap-over occurs, is permitted to thrust upon a tubular punch that is concentrically mounted in the valve housing in axial proximity to the snap-over member. This device permits the fabrication of relief valves having features not heretofore found in most prior art rupture disc relief valves. Among these features are the reliability of the disc over an extended use period including repeated pressure cycling in the system, vibrational stability, ease of adjustability to permit precise adjustment of the bursting pressure and the complete independence of the device from the strength and mechanical design of the rupture disc.

The rupture disc mounting disclosed in the aformentioned patent comprises an orifice in the valve housing with the rupturable disc resting on the upstream surface of this orifice. The snap-over member such as a conical spring washer is mounted downstream of the orifice with its face resting upon the downstream edge of the orifice and extending therethrough to support an annular region of the rupturable disc. While this construction is satisfactory for the majority of uses, we have found that it is limited to low to moderate pressure differentials because of the limited structural strength of a relatively sharp-edged orifice plate and the necessity to employ a limited number of the snap-over members.

It is an object of this invention to provide a rupture disc mounting suitable for use under high differential pressure conditions.

Another object of this invention is to provide such a rupture disc mounting in a relief valve housing.

It is a further object of this invention to provide the rupture disc mounting with means to adjust and precisely set the operating pressure of the rupture disc mounting.

A further object of this invention is to provide a rupture disc mounting assembly having force coupling means between the rupture disc and the snap-over members.

Other and related objects will be apparent from the drawing and the following description.

The invention will be described by reference to the figures of which:

Figures 1, 2:
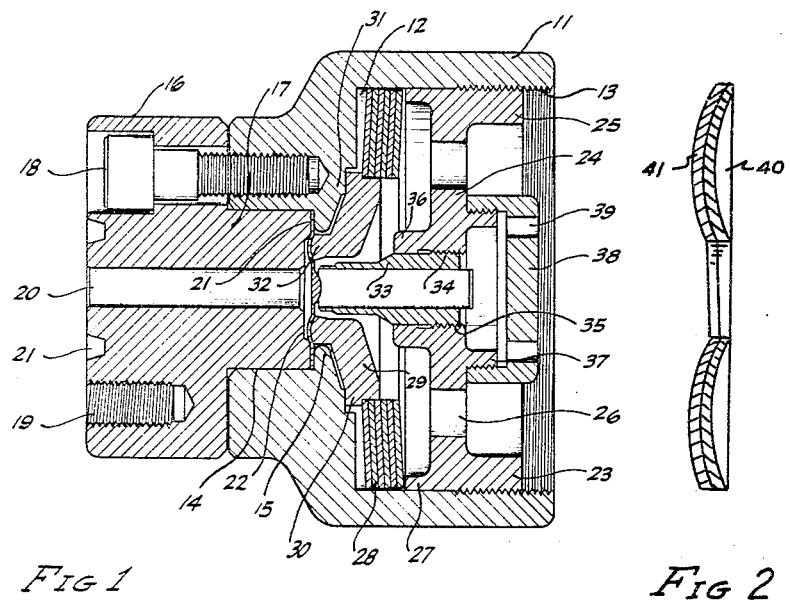
FIGURE 1 is a central longitudinal view through a device of our invention.
FIGURE 2 is a sectional view of an alternate snap-over member for use in our device.

Referring now to FIGURE 1, there is illustrated a relief valve housing with rupture disc mounting means which achieves the aforementioned objects. This device comprises a circular body 11 having a central bore 12 which is threaded at 13 on the downstream end of the body. The upstream end of the body 11 has a smaller diameter counter bore 14 and a peripheral shoulder 15 is provided a central orifice in the body 11. Flange 16 having a raised face 17 is fastened to body 11 with face 17 extending into bore 14. This flange is secured to body 11 with socket head cap screws such as 18 that engage threaded taps in body 11. Flange 16 has threaded taps such as 19 on its upstream radial surface for attachment to suitable high pressure equipment. A central fluid passageway 20 is bored through the interior of flange 16 and an O-ring seat 21 is provided as an annular groove about passageway 20.

The rupture disc 21 is secured across the central orifice of body 11 by compression of the outer periphery of the rupture disc between the outside radial face of neck 17 and annular shoulder 15.

Within body 11 is an adjustment nut 23 which is engaged in the internally threaded downstream wall 13 of body 11. This nut is in the form of a flange 24 surrounded by threaded skirt 25. Radially positioned about flange 24 are a plurality of ports 26. Skirt 25 extends upstream of flange 24 to provide to annular wall 27 which supports the outside periphery of the snap-over members 28 used in our device. One or a plurality of these snap-over members can be used in our invention; FIGURE 1 illustrating six of these elements in stacked relationship. The illustrated snap-over member is a frusto-conical spring washer, commonly referred to as a Belleville washer. The upstream, inside periphery of these washers engage an annular shoulder 30 of collar 29. In the maximum upstream position of collar 30 as illustrated, the upstream side of shoulder 30 is retained from upstream movement by radial shoulder 31 of body 11. Collar 29 has a central neck 32 which extends into orifice 15 and supports an annular region of rupture disc 21, thereby retaining this rupture disc out of contact with tubular punch 33.

The tubular punch 33 is mounted in axial promixity to burst disc 21 and is shown to extend into the interior of collar 29. Punch 33 is retained in position with its downstream end 34 engaged in a central threaded tap 35 in flange 24. Flange 24 is provided, on its upstream face, with an annular shoulder 36 to guide punch 33 and to provide radial strength to the mounting of punch 33 in flange 24. The downstream side of flange 24 has an annular lip 37 which is threaded about its outer periphery for engagement by cap 38. Cap 38 has ports 39 to provide fluid release from the chamber enclosed by the cap.

The device as described thus provides a preloaded conical spring washer to back up and support a rupture disc out of contact with a tubular punch that is positioned in axial proximity to the downstream side of the rupture disc. Although the spring washers can flex with surges in the upstream pressure, when the upstream pressure exceeds a preset point, determined by the degree of preloading of these washers with adjustment nut 25, the washers snap over center and collar 29 is receded with a snap action, permitting burst disc to be impaled on the sharp upstream edge of tubular punch 33. This action cleanly cuts a large diameter free flow passage in the burst disc and relieves the abnormal pressure through passageway 20, and ports 26 and 39. The punched out center of disc 21 is retained within the chamber defined by rim 37 and cap 38.

The construction of the device in FIGURE 1 provides for easy adjustment of the triggering action for the burst disc. Adjustment nut 25 can be axially advanced or retarded in the interior of body 11, thereby decreasing or increasing the amount of differential pressure necessary to cause snap over of spring elements 28. The tubular punch 33 can also be advanced or withdrawn in adjustment nut 25 to set precisely the proximity of the sharp end of the orifice to rupture disc 21.

While the device as thus illustrated and described in regard to FIGURE 1, utilizes a snap-over member in the shape of a frusto-conical washer, it is apparent that other alternative constructions can be utilized without departing from the scope of the invention or departing substantially from the aforementioned construction. To illustrate, the frusto-conical spring washer can be replaced with one or more bowed members such as leaf springs which are convexly oriented to the upstream side of the member and have their ends resting on annular shoulder 27 and the inner shoulder 36. In this construction the bowed center of these members would support the downstream surface of collar 29. Alternatively, a suitable snap-over member that could be used is illustrated in FIGURE 2 as washer 40 having a bowed annular face 41. The aforementioned leaf springs would have similar cross-sections to 41 but could be rectangular or shaped as a segment sector of a circle.

Figure 3:
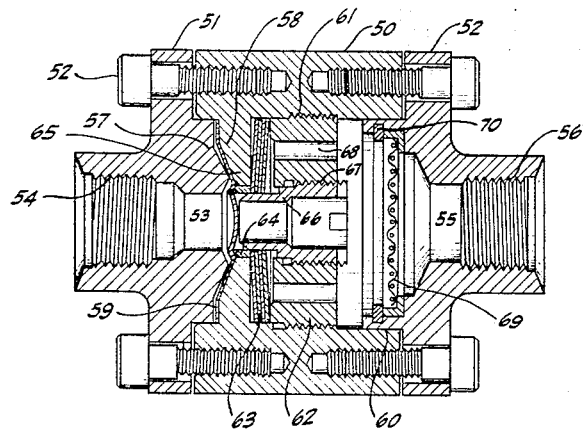
FIG. 3 is a central longitudinal view of a second device embodying our invention.

FIGURE 3 illustrates a device according to our invention which is adapted for attachment to tubular members. This device comprises a main cylindrical body 50 having an upstream flange 51 and a downstream flange 52 secured to its respective upstream and downstream faces with machine screws that engage threaded taps about the outer periphery of these faces. Flange 52 has a central fluid passageway 53 which has a threaded interior wall 54 for securing to threaded conduits. Flange 52 has a similar fluid passageway 55 which is threaded at 56 for engagement of a downstream conduit. The downstream side of flange 51 has a raised central face 57 that mates with a matching recession in the upstream face of body 50. A burst or rupturable disc is secured between these mating surfaces and extends across the central orifice defined by annular shoulder 59 of body 50.

The interior of body 50 has a central bore 60 which has a threaded inner surface 61 for engagement by adjustment nut 62. The upstream surface of nut 62 has a peripheral shoulder which supports the snap-over members that are shown in stacked array as preloaded frustoconical spring washers 63. The upstream interior edge of snap-over members 63 support collar 64 which extends through the orifice within annular shoulder 59 and retains the rupture disc out of contact with the upstream sharp edge of tubular punch 66.

Tubular punch 66 is supported within threaded central bore 67 in adjustment nut 62. A plurality of fluid ports 68 are provided in nut 62 to permit fluid communication from the chamber upstream of nut 62. A screen 69 is supported across the upstream edge of the fluid exit passageway 55 in flange 52 and suitable retaining means such as snap ring 70 is provided to retain the screen assembly in place.

The construction thus described provides for an adjustable preloading of a snap-over member 63 or series of such members which retain a rupture disc out of contact with a sharp edged tubular punch means. Although these preloaded spring elements can flex with surges in the pressure, when the upstream pressure exceeds a preset amount, determined by the amount of preloading by advancement of nut 62 in body 50, these elements will snap over center and quickly release their support of collar 64. When this occurs, collar 64 will snap downstream and the rupture disc will be impaled by the tubular punch. The punch will cut out the center of the disc and thereby permit relief of the upstream pressure through the large diameter passageway in the tubular punch. The central disc cut from the rupture disc will be retained within housing 50 by screen 69.

The preceding description demonstrates the use of a stacked array of preloaded frusto-conical spring snap-over members which bias a force coupling means against a rupture disc and thereby retain the rupture disc out of contact with a tubular punch means which is in axial proximity to the rupture disc. The sudden release of the spring bias from the force coupling means when the upstream pressure exceeds the triggering or burst pressure permits the snap-like receding of this force-transmitting means from the rupture disc so that the latter is suddenly impaled by the tubular punch. The snap action insures a clean cut passageway through the burst disc and the large diameter tubular punch provides a free flow, large diameter passageway for release of the upstream fluid. Suitable means such as screen 69 is provided to retain the cut out segment of the rupture disc and precent its blowing downstream with the released fluids.

While the invention has thus been described with particular reference to frusto-conical shaped snap-over members, it is apparent that other spring elements which have bowed centers and which readily snap over to a reverse position can be substituted without departing from the scope of the invention. It is also apparent that while the invention has been described by reference to the specific shapes and structures illustrated in the figures, this is by way of illustration of the preferred mode for practice of the invention and is not intended to be unduly limiting thereof. Instead it is intended that the invention be defined by the elements and their obvious equivalents set forth in the following claim.

We claim:
1. In a rupture disc device, a housing having an inlet and an outlet, means in the housing defining an orifice between the inlet and outlet, a rupture disc mounted in said housing upstream of the orifice and extending across the orifice to close the same, a resilient snap-over member in said housing downstream of the orifice, a force coupling means supported by the upstream face of said resilient snap-over member, said snap-over member having a first position that biases said force coupling means into said orifice to support said disc, said member being adapted to rapidly snap over center to a recessed position when the upstream pressure exceeds a set point, and means for supporting said member at its peripheral margin against movement downstream.

2. The device set forth in claim 1 in combination with punch means supported in said housing downstream of said orifice and positioned in axial proximity to said orifice so as to engage and rupture said disc when said member snaps over center.

3. The device set forth in claim 2 wherein said means for supporting said member is adjustable for deflecting said member toward snap over position whereby to preload said member and thereby precisely control said set point of upstream pressure.

4. The device as set forth in claim 3 wherein said adjustable means comprises a member threadedly mounted in the housing downstream of the member for limited movement axially of said orifice and engageable with the peripheral margin of the member.

5. The device of claim 2 wherein said punch means comprises a tubular sharp edged punch.

6. The device according to claim 2 having means to retain the cutout portion of said rupture disc within said housing.

7. The device according to claim 1 wherein a plurality of said snap-over members are employed in stacked array.

8. The device according to claim 1 wherein said snap-over member comprises a plurality of frusto-conical spring washers in stacked array.

9. The device according to claim 1 wherein said force coupling means comprises a circular collar having its downstream edge supported by said snap-over member and its upstream edge extending through said orifice and supporting said rupture disc.

References Cited

UNITED STATES PATENTS 2,079,164   5/1937   Glab _____ 137—69
2,704,551   3/1955   Ralston _____ 251—337

THERON E. CONDON, *Primary Examiner.*

R. H. SCHWARTZ, *Assistant Examiner.*